Sept. 21, 1948.   R. L. JAESCHKE   2,449,779
SPEED CONTROL FOR DYNAMOELECTRIC APPARATUS
Filed Feb. 21, 1947   2 Sheets-Sheet 2

Ralph L. Jaeschke,
Inventor.
Haynes and Koenig,
Attorneys.

Patented Sept. 21, 1948

2,449,779

UNITED STATES PATENT OFFICE 2,449,779

SPEED CONTROL FOR DYNAMOELECTRIC APPARATUS

Ralph L. Jaeschke, Kenosha, Wis., assignor to Martin P. Winther, Waukegan, Ill., as trustee Application February 21, 1947, Serial No. 730,059

10 Claims. (Cl. 172—284)

This invention relates to speed controls for dynamoelectric apparatus and more particularly to electronic speed controls adapted to maintain substantially constant the speed of a rotating element of dynamoelectric apparatus.

Among the several objects of the invention may be noted the provision of simpler and less costly means for remotely or otherwise regulating the speed of dynamoelectric apparatus (including very high-speed apparatus of this type) under varying load conditions; the provision of means for easily accomplishing this end either in the case of newly designed apparatus, or as an attachment to previously designed apparatus; and the provision of means of the class described for automatically controlling dynamoelectric apparatus at a desired speed and for selecting said desired speed. Other objects will be in part apparent and in part pointed out hereinafter.

This invention accordingly comprises the elements and combinations of elements, features of construction, and arrangements of parts which will be exemplified in the structures hereinafter described, and the scope of the application of which will be indicated in the following claims.

In the accompanying drawings, in which several of various possible embodiments of the invention are illustrated, Fig. 1 is a schematic diagram of one embodiment of the present invention;

Fig. 3 is a side elevation of a dynamoelectric apparatus illustrating another embodiment; and, Figs. 4, 5 and 6 schematically illustrate other embodiments.

Similar reference characters indicate corresponding parts throughout the several views of the drawings.

As shown in U. S. Patent 2,277,284, it has been known to control the excitation of the field coil of dynamoelectric machines such as eddy-current clutches and the like for controlling their speeds by using as a control the electric output of an A. C. generator driven from the output shaft of the machine. This is a successful method but whereon the present invention is an improvement. The generator element of the patent is best organized with the dynamoelectric machine when the latter is initially designed; whereas the corresponding elements of the present invention may be easily applied after the machine is designed, and on old machines. Furthermore, certain embodiments of the present invention are better adapted to certain newer high-speed dynamoelectric machines operating, say, at speeds of the order of 20,000-30,000 R. P. M. Greater flexibility and simplicity of design are afforded by means of the present invention.

Figure 1:
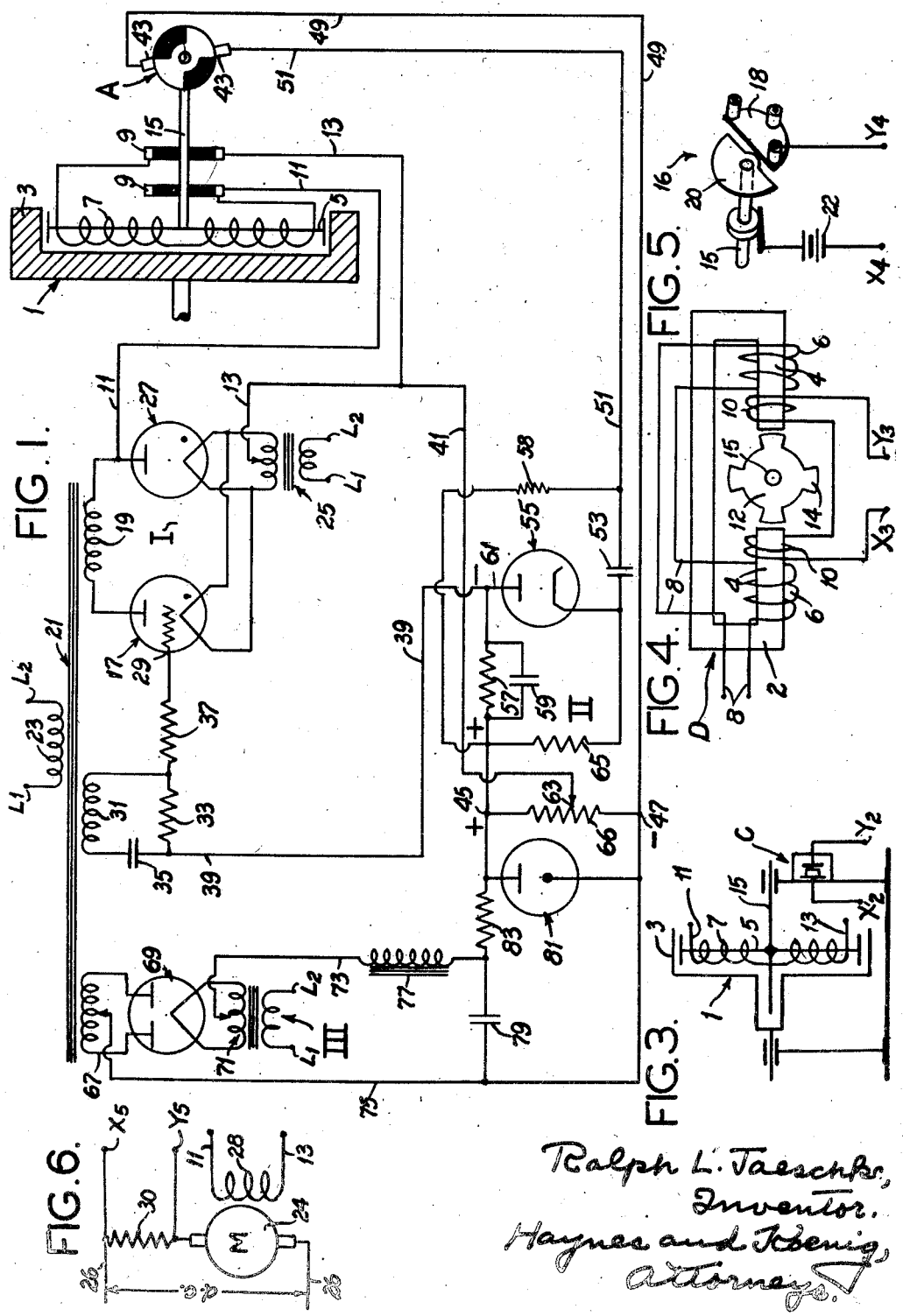

Referring now more particularly to Fig. 1, there is shown at numeral 1 an electromagnetic slip coupling unit comprising a driving member 3 and a driven member 5. The driven member 5 carries an exciter coil or field winding 7 which is adapted to be electrically energized through slip rings 9 and wires 11 and 13. An output or driven shaft 15 is mechanically connected to the driven unit 5 and carries a simple two-segment commutator unit A. The commutator pick-up unit A is adapted through a circuit, to be described below, to control the excitation of the coil 7 in such a manner as to control the degree of electromagnetic coupling between elements 3 and 5 so as to maintain substantially constant the speed of the driven shaft 15.

The electrical circuit of Fig. 1 has, for purposes of description, been subdivided into three cooperative electronic circuit sections. Circuit section I has as its function the variable energization of winding 7, the latter in effect serving as a D. C. load for circuit I. Circuit II, a frequency-discriminatory or responsive conversion circuit, serves to convert frequency-modulated electrical impulses generated by commutator pick-up unit A or its equivalent into a variable D. C. potential which is dependent upon the frequency only of these electrical impulses, and to oppose the variable D. C. potential thus produced against another potential. The difference between these two potentials controls the operation of circuit I. Circuit III is a full-wave rectifier and provides a source of constant potential D. C. voltage.

Circuit I includes a grid-controlled gaseous rectifier tube 17. This tube 17 is energized from a secondary winding 19 of a transformer 21. The transformer 21 is of the multiple winding type and is powered through a primary winding 23 and lines L—1 and L—2 which are conveniently energized from any conventional A. C. source, e. g. 110 volts, 60 cycle A. C. A filament transformer 25, fed from A. C. lines L—1 and L—2, supplies filament excitation for tube 17. Connected in parallel with tube 17 is a diode type gas-filled rectifier tube 27 which also derives its filament excitation from filament transformer 25. Tube 27 serves as a discharge tube for the half-wave rectifier circuit consisting of tube 17, secondary winding 19, wire 11, winding 7 (the D. C. load for this rectifier), wire 13 and the secondary of filament transformer 25. Since the field winding 7 has a relatively high inductance and since it is used in a D. C. unit, energy is stored up in this winding during the conducting period of the half-wave rectification. Tube 27, although non-conducting during the conducting portion of the cycle, conducts while tube 17 is not conducting and prolongs the current through winding 7, with the result that the average current through winding 7 may be maintained substantially constant for any selected level of grid bias applied to tube 17.

The amount of current delivered through winding 7 is dependent upon the potential difference between control grid 29 of tube 17 and the potential of the filament of tube 17. Circuit I also includes a secondary transformer winding 31, a resistor 33, and a condenser 35 connected in such a manner as to provide an A. C. wave of constant voltage to the grid 29 through a grid-blocking resistor 37. The circuit made up of winding 31, resistor 33 and condenser 35 comprises a phase shifter circuit. The phase of this A. C. potential is held in a fixed out-of-phase relation to the anode voltage of tube 17, due to the combined action of condenser 35 and resistor 33. This A. C. potential is so connected as to ride on the D. C. bias level applied to grid 29. The current through winding 7 supplied from circuit I can be varied in accordance with the D. C. potential impressed on grid 29 through wire 39. The increase of this D. C. potential on grid 29 in a positive direction (with the fixed out-of-phase A. C. wave riding thereon) in reference to the potential of the filament of tube 17 will cause an increase in conduction time of tube 17 and increase the current flow through winding 7. A wire 41 which is connected to the center-tap of the secondary of filament transformer 25 can be used to control the potential of the filament of tube 17. The D. C. grid potential between wires 39 and 41, which will control the energization of winding 7 as described above, is supplied from circuit II.

The frequency-responsive or frequency-discriminatory conversion circuit II provides a D. C. potential proportional to the frequency only of the electrical impulses supplied to it from commutator pick-up unit A. The action of commutator pick-up unit A can be compared to that of a switch, the frequency of the closing and opening being dependent upon the rotational speed of the driven shaft 15. Brushes 43 are used to contact this commutator unit A and there will be either an electrically short- or open-circuit condition existing between brushes 43, dependent on the position of shaft 15. (The black segments indicate insulation.) A constant potential D. C. voltage that is derived from circuit III (to be described below) is present between points 45 and 47, and connected across this D. C. potential are the components of circuit II.

The electrical circuit of circuit section II, starting at point 47, which may be considered to be of negative polarity, is as follows: wire 49, commutator pick-up unit A, wire 51, a condenser 53, a diode tube 55, and resistors 57 and 58. The impedance of condenser 53 is dependent on the frequency of the impulses supplied by commutator unit A. The unidirectional current conducted through tube 55 and load resistor 57 is dependent on the value of this impedance. The higher the impedance of condenser 53, the lower will be current through tube 55 and resistor 57. Thus it can be seen that the frequency of the impulses generated by commutator pick-up unit A control the current through resistor 57 and hence the variable D. C. potential across resistor 57 is dependent upon this frequency. A filter condenser 59 is paralleled across resistor 57 to smooth the D. C. potential developed across the resistor 57. A resistor 65 and resistor 58 are so connected in circuit II as to provide a discharge path for condenser 53. The variable D. C. potential which is present between point 45 and a point 61 (with the polarities as indicated on Fig. 1) is connected in opposition to a second D. C. potential. This second potential is that between point 45 and a control arm 63 of a potentiometer 66. The difference of the variable D. C. potential between points 45 and 61 and the potential between point 45 and brush on 63 is used as a D. C. grid-control voltage for circuit I and is impressed across wires 39 and 41. The action of such opposing D. C. potentials is explained in greater detail in United States Patent 2,277,284.

The constant potential D. C. voltage which is present across potentiometer 66, i. e. between points 45 and 47, is supplied by circuit III. This circuit consists of a secondary winding 67 of transformer 21, the ends of which are connected to the anodes of a duo-diode type rectifier tube 69. The filaments of the tube 69 are heated by means of a filament transformer 71 powered from A. C. lines L—1 and L—2. The voltage developed across secondary winding 67 is rectified by the action of the tube 69 and the full-wave rectified output is conducted by two wires 73 and 75 to a D. C. filter section comprising a choke 77, and a filter condenser 79. The wire 73 is positive in relation to wire 75 and the D. C. potential across these wires is regulated to a constant level by action of a cold-cathode voltage regulator tube 81 in conjunction with a resistor 83.

Operation is as follows:

It is initially assumed that the field winding 7 of the electromagnetic clutch 1 has been energized and the member 3 is driven by some prime mover and the driven member 5 is mechanically loaded by apparatus driven by shaft 15. It may be seen that the commutator unit A is being driven by shaft 15 and that the speed of its rotation is directly proportional to that of the shaft 15.

If an initially given load and a given speed of operation be assumed, it follows that circuit I will supply a certain current through winding 7 which determines the degree of electromagnetic slip coupling between members 3 and 5. The variable D. C. potential between point 45 and potentiometer brush arm 63 will be then opposite to the potential between points 45 and 61, arm 63 having been adjusted in position for the purpose. If we now assume that the load increases on shaft 15, or if for that or some other reason the speed of the prime mover decreases, there will be a corresponding decrease in the speed of shaft 15 and it can be seen there will be a decrease in the frequency in the impulses generated by the commutator unit A. This decrease in frequency will cause an increase in the impedance of the condenser 53 and a decrease in the current through tube 55 and resistor 57. The decreased current through resistor 57 causes a decreased potential between points 45 and 61. The potential between point 45 and potentiometer brush arm 63 will then be greater than the potential between points 45 and 61 and the difference in these potentials will be impressed across wires 39 and 41. The polarity of this potential will be such that wire 39 is positive and wire 41 is negative. This potential change causes tube 17 to conduct a greater portion of the time and the current through winding 7 to be increased.

The net effect of this action is to increase the electromagnetic coupling between members 3 and 5 and cause the output shaft 15 to speed up until the initial balanced condition is again present between the opposed potentials of circuit II. An increase in the speed of the output shaft due to any changed operating conditions will cause an inverse effect in that described above, the net effect being such as to decrease the field current through winding 7 and thus decrease the speed of output shaft 15.

Although all adjustments of the speed of the shaft 15 have been described in relation to the control exercised over circuit II by the commutator pick-up unit A, control can be exercised in another convenient manner. By manually adjusting the position of potentiometer arm 63, the speed of the shaft 15 can be adjusted to any desired value and due to the automatic action of circuit II and commutator pick-up unit A, previously described, the speed of the output shaft 15 will be maintained at this manually set speed.

Figure 2:
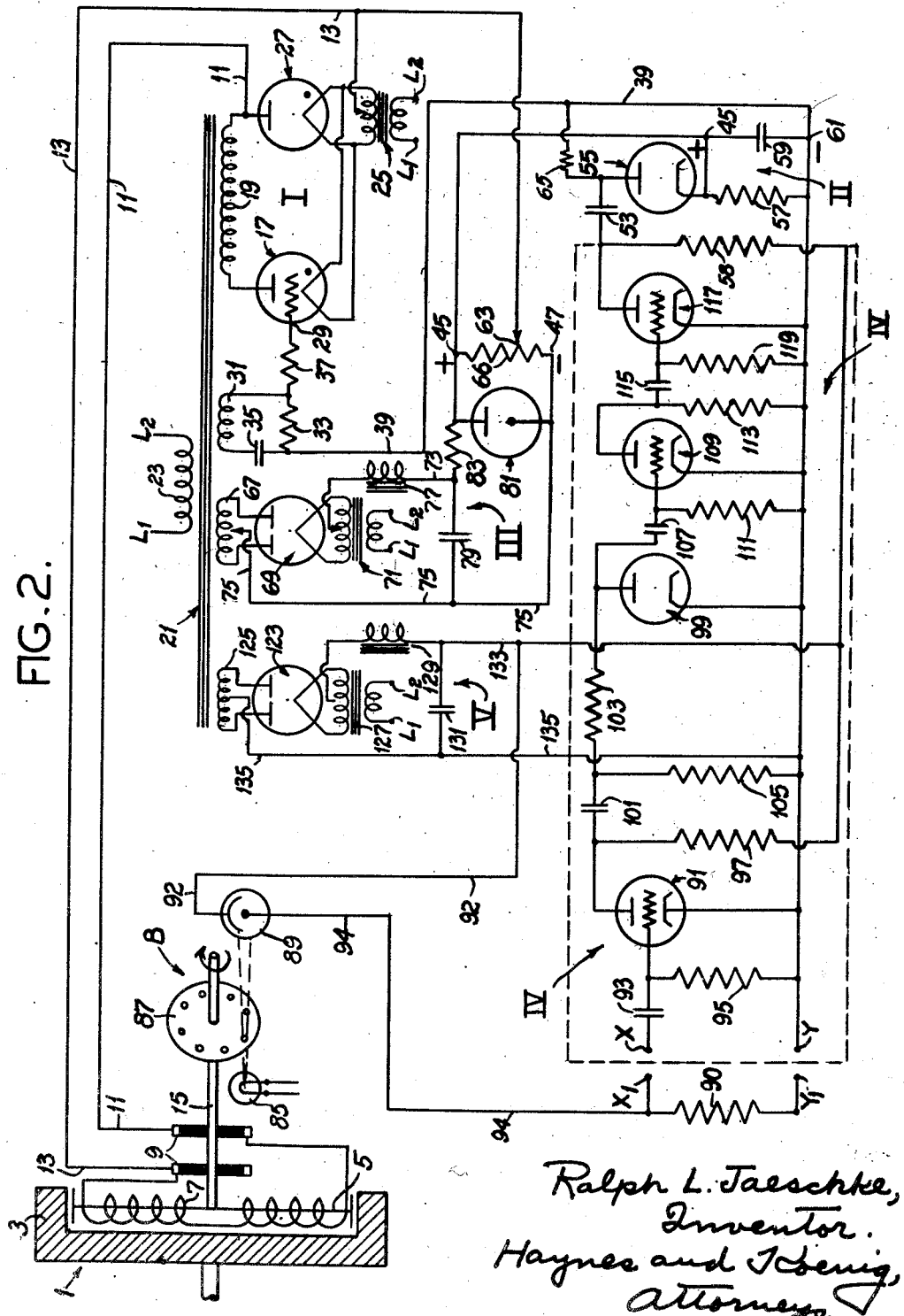
Fig. 2 is a schematic diagram of an alternative embodiment.

Broadly considered, the operation of the circuit of Fig. 2 corresponds to that of Fig. 1 and to avoid circumlocution all parts which operate similarly in both Figs. 1 and 2 will be designated by like reference characters. As described, the device of Fig. 1 has a commutator type pick-up unit A as an impulse sensitive control unit, whereas Fig. 2 employs a photoelectric unit B as the means of generating impulses of constant amplitude and varying frequency. To adapt this type of impulse sensitive unit B to the circuit of Fig. 1, two additional circuit sections IV and V are included in Fig. 2. Commutator pick-up unit A alone, or circuit IV combined with any one pick-up unit such as B, A, C, D, or the pick-up unit of Fig. 5 or Fig. 6, comprises a frequency-modulator circuit. Circuit IV is a cascade amplifier with a peak-limiting or clipper stage, which serves to amplify the impulses of the photoelectric unit B and to present a constant-amplitude variable-frequency signal to circuit II. Circuit V is a full-wave rectifier unit and supplies the power requirement of circuits II, IV, and the photoelectric unit B.

Circuit IV is provided with a set of input terminals X and Y which are coupled to an amplifier tube 91 by means of a coupling condenser 93 and a grid resistor 95. The anode of tube 91 is supplied with a D. C. potential through a plate load resistor 97. The output of tube 91 is coupled to clipper or limiter tube 99 through a coupling condenser 101 and a resistor 103. The circuit of the limiter tube 99 also includes a second resistor 105. The peak-limited signal output of tube 99 is transferred through condenser 107 to an amplifier tube 109, which includes a grid resistor 111 in its input network. The D. C. power for amplifier tube 109 is supplied through plate load resistor 113, and a coupling condenser 115 transfers the voltage variations of this resistor 113 to the grid circuit of tube 117 which includes a resistor 119. Direct current is supplied to the anode of tube 117 through the resistor 65, this resistor being the connecting component of circuits II and IV.

It is to be understood that circuit II functions the same as in Fig. 1, the only difference being that the input signal here is of more or less sinusoidal shape whereas in Fig. 1 it is of a more or less squared-type wave form. The position of the series condenser 53, resistor 65 and filter condenser 59 have been slightly altered in Fig. 2 but their operation is the same. It will also be noted that the circuit V rectifier supplies the D. C. voltage for resistor 58 in place of circuit III as shown in Fig. 1. This of course does not affect the operation of circuit II.

Circuit V includes a duo-diode type tube 123, the anodes of which are connected to the ends of the secondary winding 125 of transformer 21. The anodes of this tube 123 are energized through the filament transformer 127 from the A. C. lines L—1, L—2. The rectified full-wave D. C. output of circuit V is filtered by a filter network comprising a choke 129 and a condenser 131. A wire 133 supplies D. C. voltage to a photoelectric cell 89 and the plate circuits of tubes 91, 99, 109 and 117. A wire 135, which is negative in polarity with respect to wire 133, completes the power circuit V by connection with all the ground return leads of circuits II and IV. The photoelectric unit B consists of a perforated disc 87, which is driven by the output shaft 15, a light source 85, a photoelectric cell 89, a resistor 90 and wires 92 and 94. The light source 85 and cell 89 are so placed in relationship to the disc 87 that the light beam from the source 85 will fall on the photoelectric cell 89 only when the disc 87 is in certain positions of its rotational cycle. The photoelectric unit B in conjunction with the resistor 90 converts these intermittent flashes of light into electrical impulses, the frequency of which is dependent on the speed of the shaft 15 and disc 87. These electrical impulses are presented to circuit IV by jacks $X_1$ and $Y_1$ which are adapted to be connected to terminals X and Y of circuit IV.

The operation of the circuit of Fig. 2 is as follows:

Assuming that the output shaft is operating at a given speed and that the D. C. potential between points 45 and 61 (across resistor 57) is balanced with the opposing D. C. potential between point 45 and potentiometer arm 63, it may be seen that the frequency of the impulses delivered from the photoelectric unit B will also be a given value. If the load be decreased on the output shaft 15 (thus increasing its speed) there will be an increase in the frequency of the light flashes that strike photoelectric tube 89. This will cause the frequency of the electrical impulses through the resistor 90 to increase and as jacks $X_1$ and $Y_1$ are connected to input terminals X and Y, this increase in the frequency of electrical impulses is presented to the grid of the amplifier tube 91. The peak-limiting action tube 99 in conjunction with resistor 103 prevents any variation of amplitude of the amplified output of tube 91. Thus a signal is coupled to the amplifier tube 109 that is substantially constant in amplitude and has a frequency which increases from that representing steady state conditions. Tube 117 further amplifies this signal output of tube 109 and the variable-frequency constant-amplitude of increased frequency is impressed across resistor 58.

The impedance of the condenser 53 will be decreased by the increase in the frequency of the signal across resistor 65, and this in turn will cause an increased current flow through resistor 57 which will increase the D. C. potential between point 45 and point 61. This increased potential will override the manually selected D. C. potential between potentiometer arm 63 and point 45 and cause this difference in potential to be impressed between the grid 29 and the filament of the tube 17. This potential difference (with the phased A. C. voltage waves of resistor 33 riding thereon) is of such polarity as to drive the grid 29 more negative in relation to the filament of tube 17. This decreases the conduction time of tube 17, with a corresponding decrease in current flow through winding 7. This in turn decreases the electromagnetic coupling between members 3 and 5 and the speed of the output shaft 15 will decrease until the two opposed D. C. potentials of circuit II are again balanced. Similarly, as in the circuit of Fig. 1, the speed of the output shaft 15 may be manually adjusted to any desired speed by moving potentiometer arm 63 in the proper direction, and after such setting is made the speed desired will be constantly maintained.

It should be noted that both the commutator pick-up of Fig. 1 and the disc 87 and associated parts are quite easy to apply to a shaft such as 15 which is already in existence without the necessity for special gears or the like. In fact, further simplification in this respect can be made in Fig. 2 by simply painting alternate light and dark regions on the shaft 15 and shining a light beam thereon. The varying reflections may then be picked up by the photoelectric tube 89. This illustrates the convenience with which this type of apparatus may be adapted to machines already in existence.

As shown in Fig. 3, a piezoelectric unit C may be mounted upon the supporting pedestal of the driven shaft 15 of a coupling. This will also produce impulses of substantially constant amplitude and of frequency corresponding to the vibratory frequency of shaft 15. This frequency will be in a proportion to the speed of shaft 15. This is because the piezoelectric unit C of Fig. 3 is sensitive enough to pick up mechanical impulses caused by the out-of-balance condition, however slight, which is always present in machines of the type under consideration. This unit C when connected by means of jacks X₂ and Y₂ to the two input terminals X and Y of Fig. 2 will also supply frequency, modulated electrical impulses closely to control the output speed of dynamoelectric apparatus to any desired value. It is understood that with such connections in Fig. 2, X₁ and Y₁ are disconnected. It will be clear that the piezoelectric-crystal vibration pick-up is a class example of any suitable vibration pick-up and that a magnetic type could also be used.

Fig. 4 shows a simple variable A. C. inductor unit D which is adapted to be connected by jacks X₃ and Y₃ to input terminals X and Y of Fig. 2. This unit is constituted by a magnetic core 2 having poles 4. Primary windings are shown at 6, fed from a 60-cycle A. C. supply 8. Secondary windings are shown at 10 and these supply the jacks X₃ and Y₃. Fastened to the shaft 15 is a magnetic armature 12 having opposite teeth 14. As the armature 12 rotates and pairs of its teeth 14 intermittently become positioned opposite the poles 4, the transformer field will be varied, thus varying the voltage applied to the jacks X₃ and Y₃, the latter being for amplification to the terminals X and Y in Fig. 2. Thus this unit, when mounted on the output shaft 15, will generate electrical impulses which vary in frequency with the rotational speed of shaft 15. The output voltage of such a unit D does, however, vary in amplitude, but this variation is eliminated by the action of the clipper or limiter tube 99 so that the frequency-modulated impulses which are to be converted by frequency-discriminatory circuit II are again substantially constant in amplitude and dependent in frequency on the variation in the speed of the output shaft 15.

In the case of the pulsating unit shown in Fig. 4, simultaneous conditions should be avoided between the speed of the shaft 15 and the A. C. frequency applied to circuit 8. This can be avoided by changing the frequency of the A. C. current in circuit 8 or changing the angular distances between poles on the armature 12, or both.

In Fig. 5 is shown another simple means for obtaining impulses. This is by means of a rotary condenser 16 consisting of at least one relatively stationary plate 18 and at least one rotary plate 20 driven from the shaft 15. A battery 22 applies D. C. voltage to the condenser. As the plate 20 moves at shaft speed, impulses are applied to the connected jacks X₄ and Y₄, the latter being for application to the terminals X and Y of Fig. 2. With the jacks X₄ and Y₄ applied as stated, the operation of the Fig. 2 circuit will be clear without further description.

It should be understood that the invention is not limited in application to slip couplings, but that it is applicable to the control of a wide range of dynamoelectric machines. For example, in Fig. 6 there is shown a D. C. motor 24 in a D. C. circuit 26. The field coil of this motor is shown at 28 and, for control purposes, corresponds to the coils 7 in Fig. 2 and is fed by lines 11 and 13. That is to say, instead of controlling a clutch coil 7, the control is to be of motor coil 28. Therefore, coil 28 is fed by the circuit of Fig. 2. To apply impulses to terminals X and Y of Fig. 2, jacks X₅ and Y₅ are employed, as shown in Fig. 6, these being on opposite sides of a small resistance 30 having for example a 1-volt drop. When the motor 24 operates, there will naturally occur a so-called commutator ripple current in circuit 26. This current applied to the resistance 30 causes a corresponding ripple voltage wave across the resistance 30 which is applied to the jacks X₅ and Y₅ and thus to terminals X and Y when the jacks X₅ and Y₅ are connected. Thus, through the circuit of Fig. 2, control is obtained of the motor field 28 if, as is assumed, this field be substituted in the Fig. 2 circuit for the field 7. The result is that the motor speed may be as effectively controlled as has been described in respect to the speed of shaft 15.

The various impulse-sensitive pick-up units described may by wiring be remotely positioned with respect to the balance of the circuit, if desired, and thus the speed can be conveniently controlled from remote positions.

It is also to be understood that although Figs. 1 and 2 illustrate the frequency-responsive reaction in circuit II as a condenser 53, an inductance could also be used and would only necessitate a few minor wiring modifications.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. An electronic speed control for dynamoelectric apparatus having a rotating shaft and an exciter coil adapted variably to control the speed of said shaft, comprising a grid-controlled rectifier means adapted variably to excite said coil, a frequency-modulator circuit for producing electrical impulses of substantially constant amplitude proportional in frequency to the speed of the shaft, a frequency-responsive conversion circuit fed by said modulator circuit and adapted to produce a variable D. C. potential dependent on the frequency of said impulses, and a source of substantially constant D. C. potential connected in opposition to said variable D. C. potential to produce a grid-controlling potential, said grid-controlling potential being applied to the grid-controlled rectifier means variably to energize said coil to maintain substantially constant the speed of said shaft.

2. An electronic speed control for dynamoelectric apparatus having a rotating shaft and an exciter coil adapted variably to control the speed of said shaft, comprising a grid-controlled rectifier means adapted variably to excite said coil, a frequency-modulator circuit for producing electrical impulses of substantially constant amplitude proportional in frequency to the speed of the shaft, a frequency-responsive conversion circuit fed by said modulator circuit and adapted to produce a variable D. C. potential dependent on the frequency of said impulses, a source of substantially constant D. C. potential, connected in opposition to said variable D. C. potential to produce a grid-controlling potential, said grid-controlling potential being applied to the grid-controlled rectifier means variably to energize said coil to maintain substantially constant the speed of said shaft, and means for independently controlling the value of said substantially constant D. C. potential.

3. An electronic speed control for dynamoelectric apparatus having a rotating shaft and a current-energized excitation coil adapted variably to control the speed of said rotating shaft, comprising a grid-controlled rectifier adapted variably to energize said excitation coil, a frequency-modulator circuit adapted to produce electrical impulses of substantially constant amplitude proportional in frequency to the rotational speed of said rotating shaft, a frequency-discriminatory circuit fed by said modulator circuit and adapted to produce a variable D. C. potential dependent upon the frequency of said electrical impulses, a manually adjustable source of substantially constant D. C. potential connected in opposition to said variable D. C. potential to produce a grid-controlling D. C. potential, and a phase shifter circuit adapted to produce a substantially constant A. C. potential to ride on said grid-controlling potential and to be in a fixed out-of-phase relationship with the anode voltage of said grid-controlled rectifier, said grid-controlling potential and said A. C. riding potential being adapted to control said grid-controlled rectifier and thus variably to energize said excitation coil to maintain the rotational speed of said rotating shaft substantially constant, the governed speed of said rotating shaft being dependent on the value of the manually adjustable D. C. potential.

4. An electronic speed control for dynamoelectric apparatus having a rotating shaft and a current-energized excitation coil adapted variably to control the speed of said rotating shaft, comprising a grid-controlled rectifier adapted variably to energize said excitation coil, a pick-up adapted to produce frequency-modulated electrical impulses proportional in frequency to the rotational speed of said rotating shaft, an amplifier system having at least one vacuum tube adapted to amplify said frequency-modulated electrical impulses, a peak limiter circuit including at least one vacuum tube adapted to maintain the amplitude of said electrical impulses at a substantially constant level, a frequency-discriminatory circuit fed by said peak limiter circuit and adapted to produce a variable D. C. potential dependent upon the frequency of said electrical impulses, a source of substantially constant D. C. potential connected in opposition to said variable D. C. potential to produce a grid-controlling D. C. potential, said grid-controlling potential being adapted to control said grid-controlled rectifier and thus variably to energize said excitation coil to maintain the rotational speed of said rotating shaft substantially constant.

5. An electronic speed control for dynamoelectric apparatus having a rotating shaft and a current-energized excitation coil adapted variably to control the speed of said rotating shaft, comprising a grid-controlled rectifier adapted variably to energize said excitation coil, a pick-up adapted to produce frequency-modulated electrical impulses proportional in frequency to the rotational speed of said rotating shaft, an amplifier system having at least one vacuum tube adapted to amplify said frequency-modulated electrical impulses, a peak limiter circuit including at least one vacuum tube adapted to maintain the amplitude of said electrical impulses at a substantially constant level, a frequency-responsive rectifier circuit including at least one diode rectifier tube, at least one resistor and a reactance, said rectifier circuit being adapted to be series-connected with said pick-up, said frequency-responsive rectifier circuit being responsive to the frequency of said frequency-modulated impulses to produce a variable D. C. potential across said resistor, a manually adjustable source of substantially constant D. C. potential connected in opposition to said variable D. C. potential to produce a grid-controlling potential, and a phase shifter circuit adapted to produce a substantially constant A. C. potential to ride on said grid-controlling potential and to be in a fixed out-of-phase relationship with the anode voltage of said grid-controlled rectifier, said grid-controlling potential with said A. C. potential riding thereon being adapted to control said grid-controlled rectifier and thus variably to energize said excitation coil to maintain the rotational speed of said rotating shaft substantially constant, the governed speed of said rotating shaft being dependent on the value of the manually adjustable D. C. potential.

6. An electronic speed control for dynamoelectric apparatus having a rotating shaft and a current-energized excitation coil adapted variably to control the speed of said rotating shaft, comprising a grid-controlled rectifier adapted variably to energize said excitation coil, a variable inductor unit actuated by said rotating shaft and adapted to produce variable-frequency electrical impulses proportional in frequency to the rotational speed of said rotating shaft, an amplifier system having at least one vacuum tube adapted to amplify said frequency-modulated electrical impulses, a peak limiter circuit including at least one vacuum tube adapted to maintain the amplitude of said electrical impulses at a substantially constant level, a frequency-discriminatory circuit fed by said limiter circuit and adapted to produce a variable D. C. potential dependent on the frequency of said electrical impulses, a source of substantially constant D. C. potential connected in opposition to said variable D. C. potential to produce a grid-controlling D. C. potential, said grid-controlling potential adapted to control said grid-controlled rectifier and thus variably to energize said excitation coil to maintain the rotational speed of said rotating shaft substantially constant.

7. An electronic speed control for dynamoelectric apparatus having a rotating shaft and a current-energized excitation coil adapted variably to control the speed of said rotating shaft, comprising a grid-controlled rectifier adapted to energize said excitation coil, a frequency-modulator circuit adapted to produce electrical impulses of substantially constant amplitude proportional in frequency to the rotational speed of said rotating shaft, a frequency-responsive rectifier circuit including at least one diode rectifier tube, at least one load resistor and a reactance series-connected with said tube and one of said load resistors, said rectifier circuit being series-connected with said modulator circuit, the variable D. C. potential across said resistor being dependent upon the frequency of said frequency-modulated impulses, and a source of substantially constant D. C. potential connected in opposition to said variable D. C. potential to produce a grid-controlling D. C. potential, said grid-controlling potential adapted to control said grid-controlled rectifier and thus variably to energize said excitation coil to maintain the rotational speed of said rotating shaft substantially constant.

8. An electronic speed control for dynamoelectric apparatus having a rotating shaft and an exciter coil adapted variably to control the speed of said shaft, comprising a grid-controlled rectifier means adapted variably to excite said coil, commutator means driven by the shaft and producing electrical impulses of substantially constant amplitude proportional in frequency to the speed of the shaft, a frequency-responsive conversion circuit fed by said impulses and adapted to produce a variable D. C. potential dependent on the frequency of said impulses, and a source of substantially constant D. C. potential connected in opposition to said variable D. C. potential to produce a grid-controlling potential, said grid-controlling potential being applied to the grid-controlled rectifier means variably to energize said exciter coil to maintain substantially constant the speed of said shaft.

9. An electronic speed control for dynamoelectric apparatus having a rotating shaft and an exciter coil adapted variably to control the speed of said shaft, comprising a grid-controlled rectifier means adapted variably to excite said coil, an inductor adapted to produce electrical impulses proportional in frequency to the speed of the shaft, a peak limiter circuit including at least one vacuum tube adapted to maintain the amplitude of said electrical impulses at a substantially constant level, a frequency-responsive conversion circuit fed by said limiter circuit and adapted to produce a variable D. C. potential dependent on the frequency of said impulses, and a source of substantially constant D. C. potential connected in opposition to said variable D. C. potential to produce a grid-controlling potential, said grid-controlling potential being applied to the grid-controlled rectifier means variably to energize said coil to maintain substantially constant the speed of said shaft.

10. An electronic speed control for dynamoelectric apparatus having a rotating shaft and an exciter coil adapted variably to control the speed of said shaft, comprising a grid-controlled rectifier means adapted variably to excite said coil, a variable condenser responsive to shaft movement for producing electrical impulses proportional in frequency to shaft movement, a frequency-responsive conversion circuit fed by said impulses and adapted to produce a variable D. C. potential dependent on the frequency of said impulses, and a source of substantially constant D. C. potential connected in opposition to said variable D. C. potential to produce a grid-controlling potential, said grid-controlling potential being applied to the grid-controlled rectifier means variably to energize said coil to maintain substantially constant the speed of said shaft.

RALPH L. JAESCHKE.

REFERENCES CITED

The following references are of record in the file of this patent:

UNITED STATES PATENTS

| Number | Name | Date |
| --- | --- | --- |
| 1,756,573 | Stoller | Apr. 29, 1930 |
| 1,972,689 | Meyer | Sept. 4, 1934 |
| 1,991,066 | Staege | Feb. 12, 1935 |
| 2,254,899 | Laubenheimer | Sept. 2, 1941 |
| 2,277,284 | Winther | Mar. 24, 1942 |